US009373153B2

(12) United States Patent
Nash et al.

(10) Patent No.: US 9,373,153 B2
(45) Date of Patent: Jun. 21, 2016

(54) DIAGNOSING GRAPHICS DISPLAY PROBLEMS

(71) Applicant: GLOBALFOUNDRIES INC., Grand Cayman (KY)

(72) Inventors: Charlotte L. Nash, Portsmouth (GB); Stephen J. Upton, Hursley (GB); David R. Waddling, Hursley (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 123 days.

(21) Appl. No.: 14/487,756

(22) Filed: Sep. 16, 2014

(65) Prior Publication Data

US 2015/0091922 A1 Apr. 2, 2015

(30) Foreign Application Priority Data

Oct. 1, 2013 (GB) .................................. 1317389.3

(51) Int. Cl.
*G06T 1/20* (2006.01)
*G06T 1/60* (2006.01)
*G06T 15/00* (2011.01)

(52) U.S. Cl.
CPC ... *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| 5,513,307 | A | 4/1996 | Naka et al. |
| 6,128,008 | A | 10/2000 | Ogawa |
| 7,987,065 | B1 * | 7/2011 | de Waal ............... G06F 11/3692 702/118 |
| 8,216,041 | B2 | 7/2012 | Verardi et al. |
| 2005/0271361 | A1 * | 12/2005 | Aoki ........................ H04N 7/01 386/344 |
| 2007/0294671 | A1 * | 12/2007 | Demetriou .......... G06F 11/3664 717/124 |
| 2009/0158257 | A1 * | 6/2009 | Xu ......................... G06F 11/362 717/129 |
| 2014/0327686 | A1 * | 11/2014 | Jia ............................. G06T 1/20 345/522 |

FOREIGN PATENT DOCUMENTS

| CN | WO2014134912 | * | 9/2014 | ................. G06T 1/20 |
| EP | 1561496 B1 | | 3/2007 | |
| JP | H01149124 | * | 6/1989 | .............. G06F 3/048 |
| JP | H01149124 A | | 6/1989 | |

OTHER PUBLICATIONS

Search Report under Section 17(5) dated Feb. 20, 2014, Application No. GB1317389.3, 3 pages.
Jang, Byunghyun et al., "Multi GPU Implementation of Iterative Tomographic Reconstruction Algorithms", IEEE International Symposium on Biomedical Imaging: from Nano to Macro, Jun. 2009, pp. 185-188.
Yuan, Youwei et al., "Animated Impostors Manipulation for Real-Time Display in Games Design", Edutainment '08, LNCS, vol. 5093, Jun. 2008, pp. 544-550.

* cited by examiner

*Primary Examiner* — Maurice L McDowell, Jr.
*Assistant Examiner* — Donna J Ricks
(74) *Attorney, Agent, or Firm* — Thompson Hine LLP

(57) ABSTRACT

A mechanism is provided for diagnosing graphics display problems during running of an application. A frame of the application drawn by a graphics processing unit is selected. A central processing unit draws the frame. The graphics processing unit drawn frame and the central processing unit drawn frame are compared to determine if there is a graphics problem.

20 Claims, 5 Drawing Sheets

DIAGNOSING GRAPHICS DISPLAY PROBLEMS

BACKGROUND

This invention relates to the field of graphics displays. In particular, the invention relates to diagnosing graphics display problems.

When using graphics to play a personal computer game, as opposed to a console game, problems often arise with the graphics which users are unable to solve due to technical issues. Most users do not have sufficient technical knowledge to diagnose an in-game problem. This can be very frustrating for a user.

A current solution requires a user to have enough technical knowledge to correctly identify a graphical issue and then be able to search for a solution to a problem using the Internet. This requires the user to use technical specifications and terminology, and hope that the problem can be answered online. In the meantime, the issue in the game persists, which means the user cannot continue to play.

A gaming user may not have technical knowledge and may be not sure if the problem is a hardware or software problem. Sometimes there are problems unique to a user's individual hardware/software set-up that are not answered online. In the event that no solution is known, it could be that the player gives up, and the product opined to be defective.

A common complaint in the gaming industry is that users would do more personal computer gaming, as opposed to console gaming, if problems were less difficult to diagnose and fix.

Therefore, there is a need in the art to address the aforementioned problems.

SUMMARY

In one illustrative embodiment, a method, in a data processing system, is provided for diagnosing graphics display problems during running of an application. The illustrative embodiment selects a frame of the application drawn by a graphics processing unit. The illustrative embodiment instructs a central processing unit to draw the frame. The illustrative embodiment compares the graphics processing unit drawn frame and the central processing unit drawn frame to determine if there is a graphics problem.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

The described aspects of the invention provide the advantage of enabling a user to determine the nature of a problem on-screen.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for determining fault origin for a graphics display. The method and system may provide appropriate technical feedback of display issues using a graphics card whilst playing a game.

By the user activating the described application whilst in-game, the native central processing unit (CPU) is triggered to generate the current single on-screen frame, in addition to the frame generated by the graphics processing unit (GPU). When the user observes a graphical error on screen, the user chooses to invoke the described method via an action. When the described method is invoked, the data in the GPU memory that is used for the generation of the frame is copied into main memory. The CPU is then instructed to generate the frame, using the copy of the data that is currently in the main memory.

The current GPU-generated image may be displayed to the user for comparison with the image generated by the CPU. The user may look for disparity between the two images, and may confirm via a user interface if they are the same or different. This may deduce whether the on-screen problem is caused by a graphics issue or not.

Figure 1:
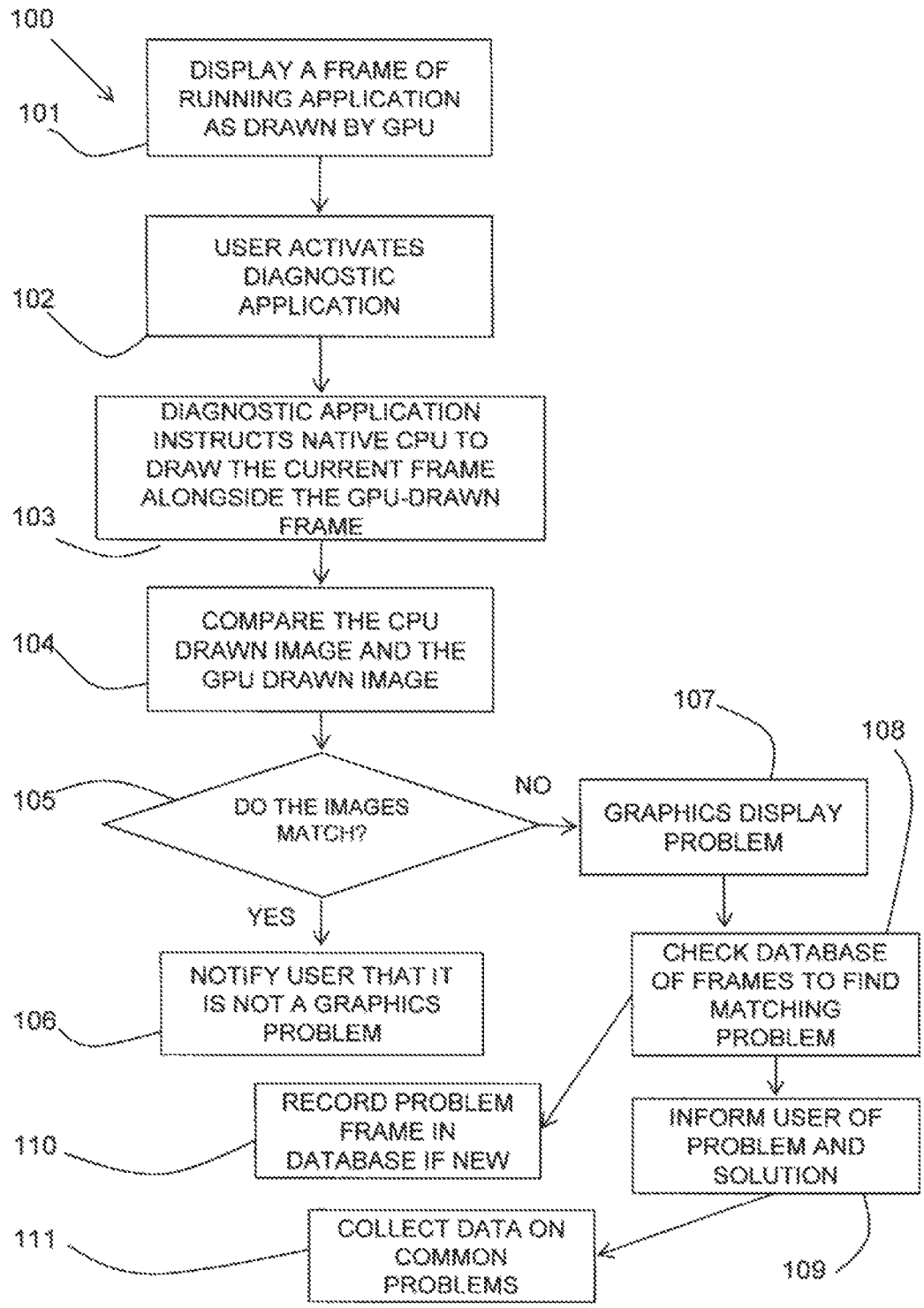
FIG. 1 is a flow diagram of a first example embodiment of a method in accordance with the present invention.

Referring to FIG. 1, a flow diagram 100 shows a first example embodiment of the described method.

A user may be running an application with high graphics usage, which uses a graphics card (for example, playing a personal computer based game). The screen may display 101 a frame incorrectly. The incorrect display may be any form of display problem including being unable to view the game on the screen, having only a partial or interrupted view displayed on the screen, or having any other effect displayed which is not the expected view of the game.

The user may activate 102 a diagnostic application, for example, via a user interface. When the diagnostic application is activated, the data in the GPU memory that is used for the generation of the frame is copied into main memory. The CPU is then instructed to generate the frame, using the copy of the data that is currently in the main memory.

The diagnostic application may instruct the native central processing unit (CPU) to draw 103 the current frame that is currently in main memory and display the image on screen alongside the frame drawn by the graphics processing unit (GPU).

The user may compare 104 the CPU generated image to the GPU generated image. Alternatively, this comparison may be carried out automatically by the application. It is determined 105 if they match. If they match it is not a graphical problem and the user is notified 106 of this.

If the images do not match, this indicates that it may be 107 a graphical display problem. A database of game frames may be checked 108 to find a matching problem. A matching problem may show a frame as having the same incorrect display.

The user may be informed 109 of the problem type and how to fix it. The problem frame may also be recorded 110 in the database if it is a new problem. Optionally, data may be collected 111 on common problems to be analysed and addressed by the game software developer.

Figure 2:
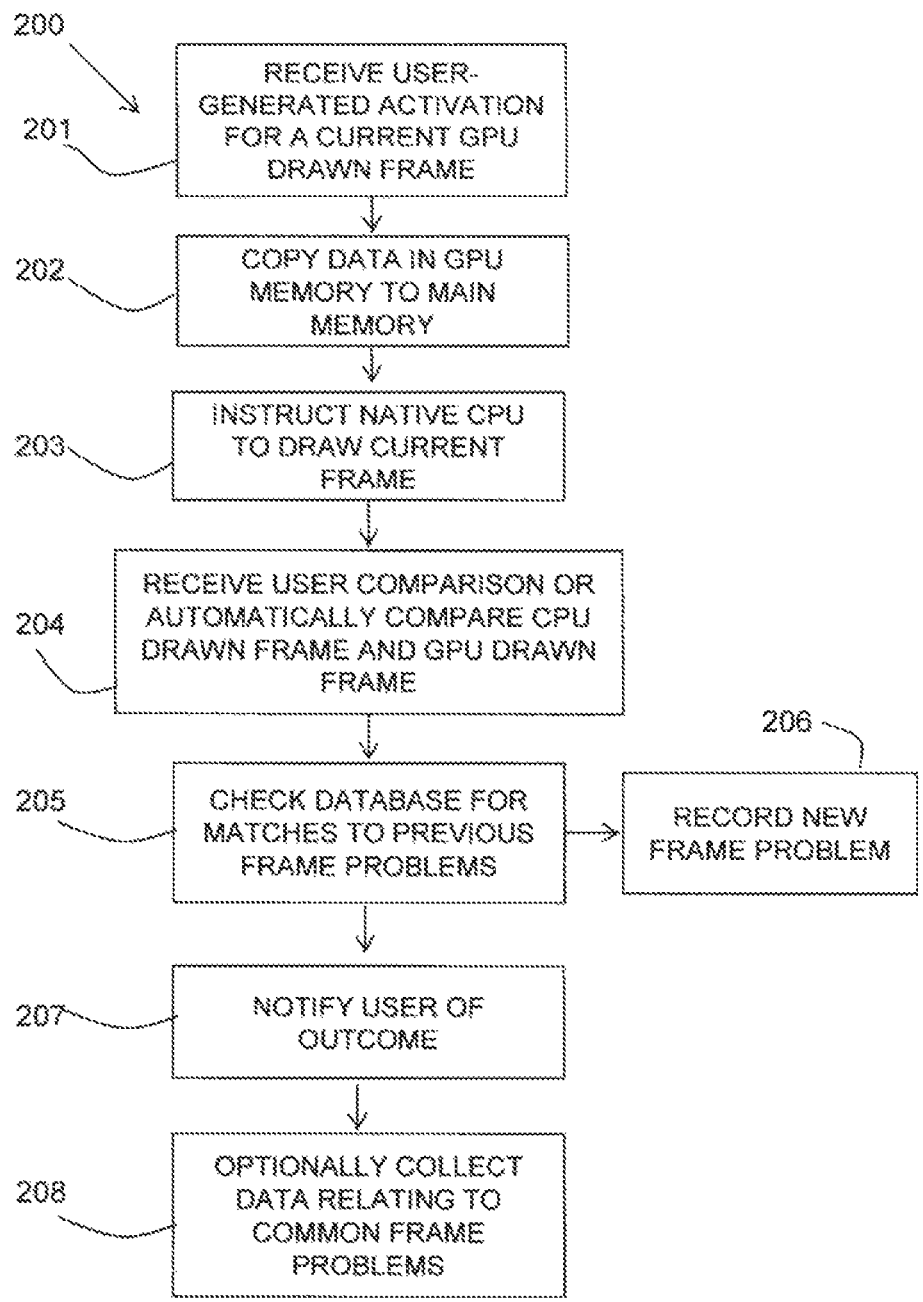
FIG. 2 is a flow diagram of the first example embodiment of FIG. 1 as executed by an application in accordance with the present invention.

Referring to FIG. 2, a flow diagram 200 shows the first example embodiment of FIG. 1 as processed by a diagnostic tool application.

The application may receive a user-generated activation 201 for a frame currently being displayed by the GPU which may have display problems. The application may copy 202 the data in the GPU memory, that is used for the generation of the frame, to main memory. The application may instruct 203 the native CPU to draw the frame, using the copy of the data that is currently in the main memory.

User input may then be received 204 indicating if the CPU drawn frame and the GPU drawn frame match. Alternatively, this comparison may be carried out automatically by the application.

If the frames do not match, the application may check 205 a database of frames for previous frame problems. If a match is not found in the database, a record 206 may be made in the database of the new frame.

The user may be notified 207 of the outcome which may be that it is not a graphics problem, it is a known graphics problem with a solution, or it is a graphics problem but previously unknown and without a solution. The application may provide assistance in executing a solution.

The application may collect 208 data relating to recurrent or common problem frames.

Figure 3:
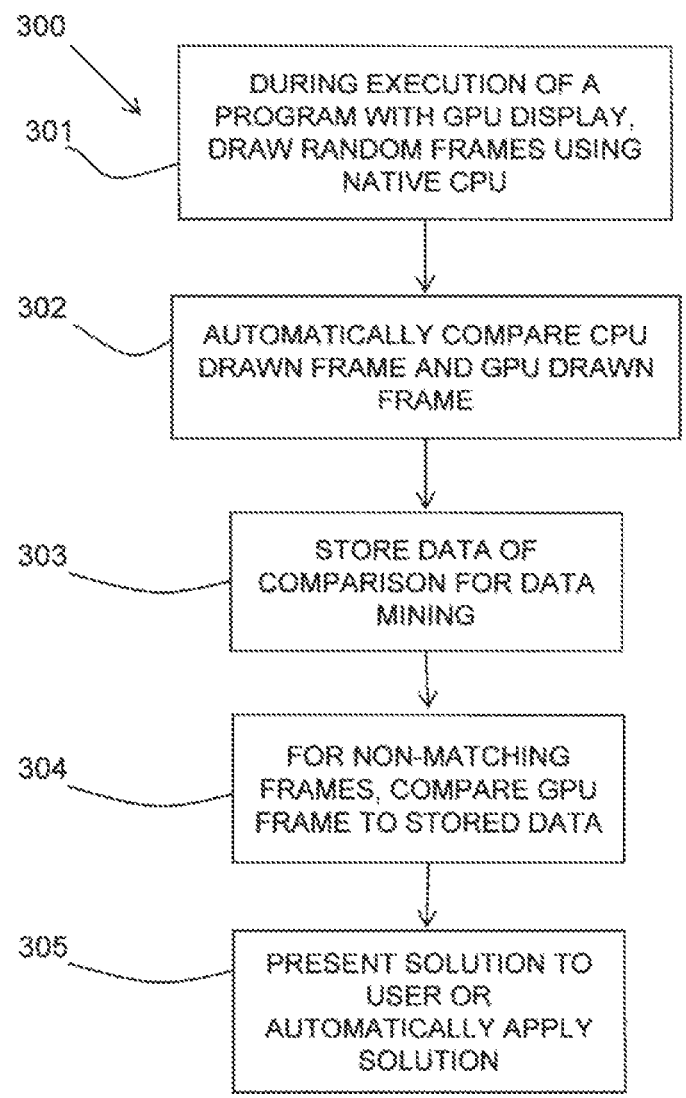
FIG. 3 is a flow diagram of a second example embodiment of a method in accordance with the present invention.

Referring to FIG. 3, a flow diagram 300 shows a second example embodiment of the described method.

An automatic diagnostic application may be provided and, during the execution of a program with a GPU display, may draw 301 random frames using the native CPU. The CPU drawn frames may be automatically compared 302 to the corresponding GPU drawn frames. The data resulting from the comparison may be stored 303 for data mining by the program developers.

In this embodiment, the automatic diagnostic application may, without user intervention, randomly draw and compare the occasional frame on the CPU so as to gain a large set of sample data, which could be mined (e.g. by the game supplier).

Any CPU drawn frames that do not match the corresponding GPU drawn frame may be matched 304 to existing stored data. The stored data may show frame problems and have associated solutions which may be presented 305 to a user or may be automatically applied.

The automatic diagnostic application may run in the background of a user's system without the user needing to be aware of the tool and may provide a notification of a solution is a problem is automatically identified.

Figure 4:
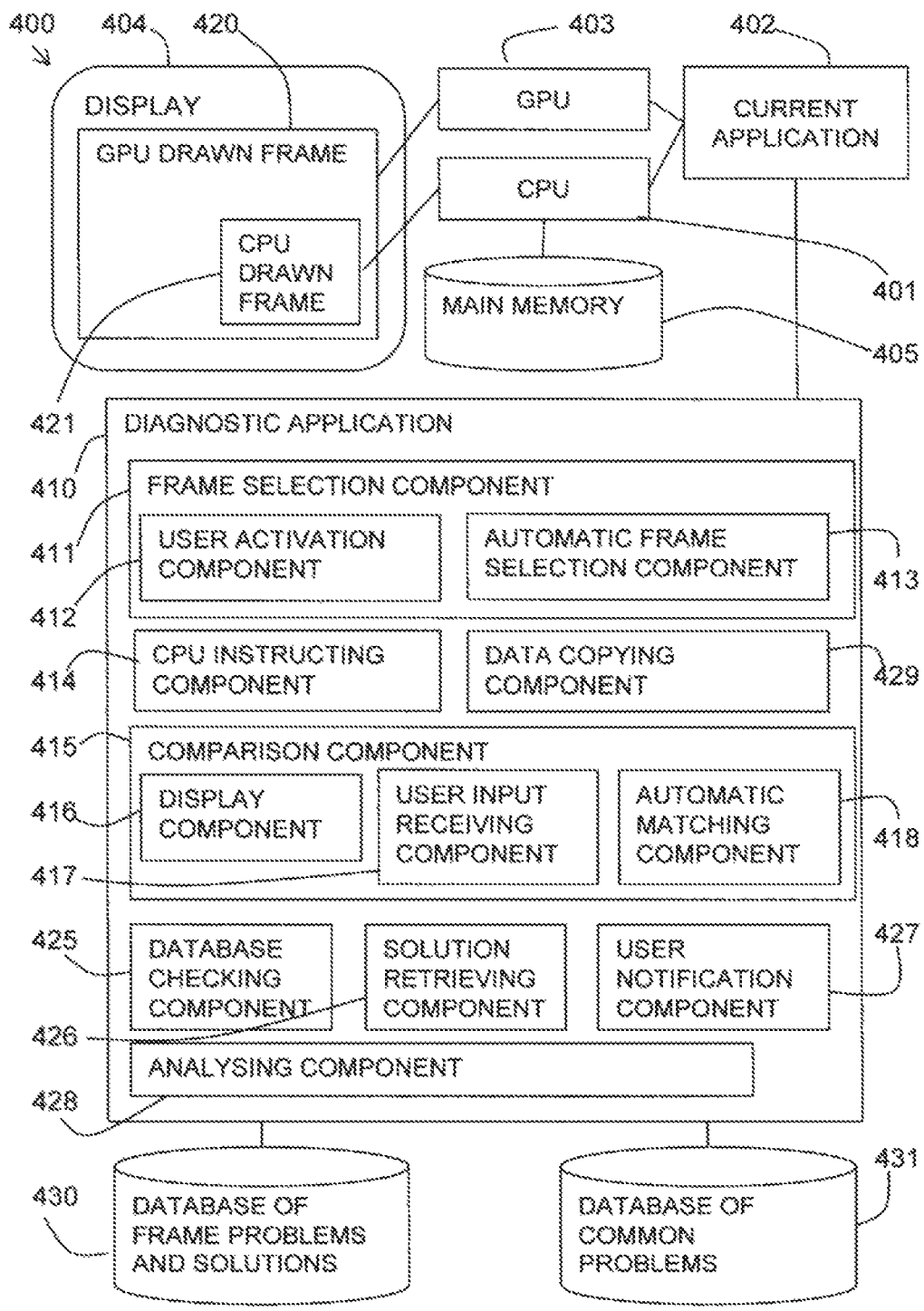
FIG. 4 is block diagram of an example embodiment of a system in accordance with the present invention.

Referring to FIG. 4, a block diagram shows an example embodiment of the described system 400.

The system 400 may include a main memory 405 and a CPU 401 for processing computer instructions, including a current application 402 such as a gaming application or other application involving high graphics content. A GPU 403 may be provided and used for processing graphics for the current application 402 and displaying the graphics on a display 404.

A GPU, which may also be referred to as a visual processing unit (VPU), is a specialised electronic circuit designed to manipulate and alter memory to accelerate the creation of images in a frame buffer intended for output to a display. Modern GPUs are very efficient at manipulating computer graphics, and their highly parallel structure makes them more effective than general-purpose CPUs for algorithms where processing of large blocks of data is done in parallel. In a personal computer, a GPU may be present on a video card, or it may be on the motherboard or on the CPU die.

A diagnostic application 410 may be provided. The diagnostic application may include a frame selection component 411. The frame selection component 411 may include a user activation component 412 for receiving a user activation of the diagnostic application processing for a specific GPU drawn frame 420 of the current application 402. The frame selection component 411 may alternatively or additionally include a random frame selection component 413 for randomly selecting a GPU drawn frame 420 of the current application 402.

The diagnostic application 410 may include a data copying component 429 for copying the data in the GPU memory that is used for the generation of the selected frame into main memory 405.

The diagnostic application 410 may include a CPU instructing component 414 for instructing the native CPU to draw the frame selected by the frame selection component 411 using the copy of the data that is currently in the main memory 405.

A comparison component 415 may be provided. In one embodiment, the comparison component 415 may include a display component 416 for displaying the CPU drawn frame 421 in conjunction with the GPU drawn frame 420 in the display 404. This may be by displaying the frames 420, 421 side by side, or with the CPU drawn frame 421 in an insert window of the main display of the GPU drawn frame 420, or any other suitable arrangement. The comparison component 415 may include a user input receiving component 417 for receiving user input regarding whether or not the two displayed frames 420, 421 match.

In another embodiment, the comparison component 415 may execute automatically without user input and may include an automatic matching component 418 for determining if the CPU drawn frame 421 matches the GPU drawn frame 420.

The diagnostic application 410 may include a database checking component 425 for checking if a similar problem to the GPU drawn frame 420 which does not match the CPU drawn frame (which indicates there is a graphics problem) has previously been stored in a database 430 of frame problems. The database 430 of frame problems may have associated solutions which may be retrieved by a solution retrieving component 426.

The diagnostic application 410 may include a user notification component 427 for notifying the user of a graphics problem and providing a solution if available.

The diagnostic application 410 may further include an analysing component 428 for storing data 431 relating to common frame problems for further analysis.

Figure 5:
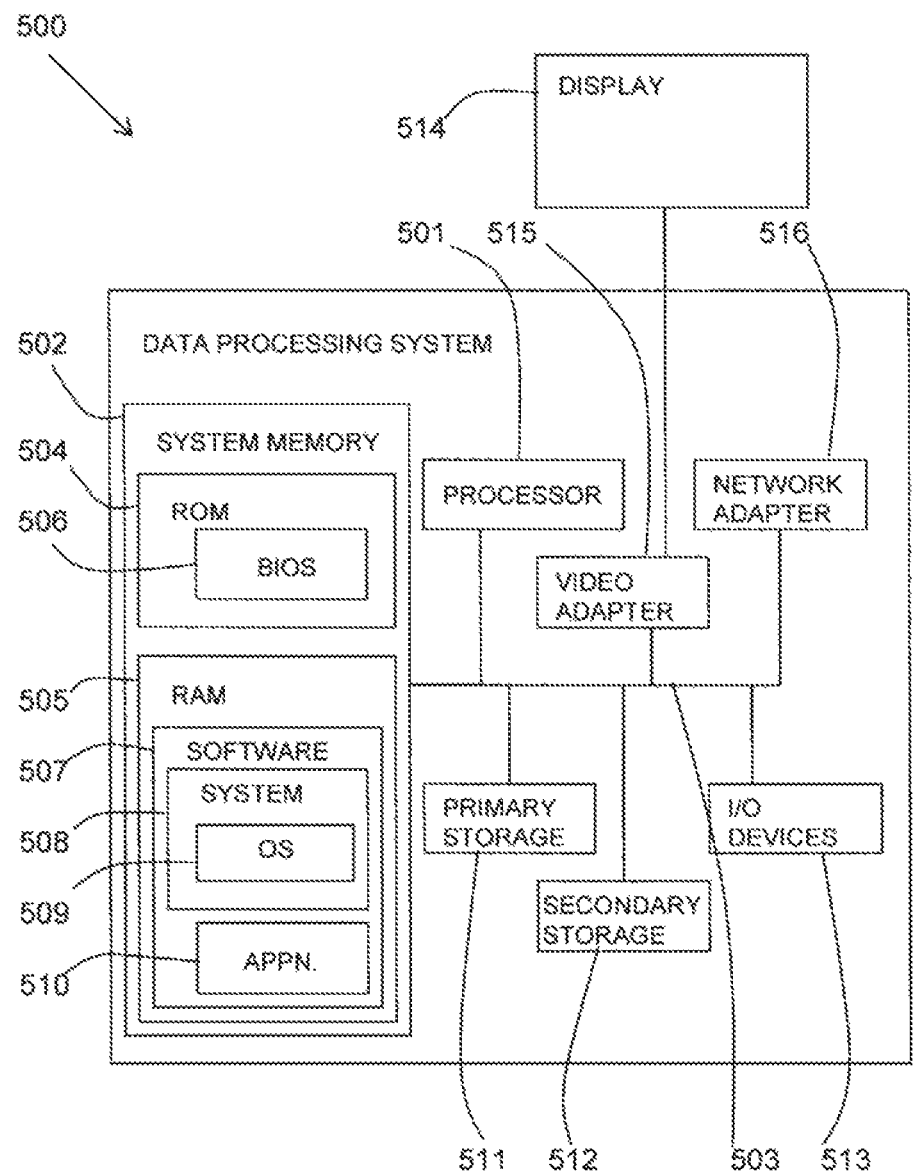
FIG. 5 is a block diagram of an embodiment of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. Software 507 may be stored in RAM 505 including system software 508, which includes operating system software 509. Software applications 510 may also be stored in RAM 505 as part of software 507.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515 which may include a GPU.

An advantage of the described method is to establish if the on-screen display is as the user would expect it, and to empower them to fix it. This may be achieved by the user activating the diagnostic method in-game and comparing any irregularly displayed frames to CPU drawn frames or, alternatively, a background method may automatically carry out the comparison.

The described method and system are designed to help non-technical users quickly ascertain the nature of an on-screen problem and to get help fixing it. This saves time and frustration and increases confidence in personal computer gamers.

The described method may be implemented across any personal computer (or other non-console device) capable of running game software or other software requiring a high intensity of graphics and therefore using a GPU.

Once generated, the application compared the current GPU generated image against the image generated by the CPU and looks for disparity. This deduces whether the on-screen problem is caused by a graphics issue or not. A message may inform the user or the nature of the problem and, optionally, may automatically assist. This helps players identify if they need to fix game files, or their own hardware/software settings.

An advantage is that this is quick, easy, and does not necessarily depend on someone else having asked the question before. Known problem information may be captured during a test phase of the product lifecycle by the developers using the described method.

Another advantage is that the method may be potentially used to mine gaming data of the end product, based on frequency of use and problem occurrence. This may be activated if the gamer is currently connected to the Internet. This may also allow for more powerful problem-solving, instantly directing the player to the precise solution they need, or even automatically fixing it for them in-game.

The diagnosis method may be built into each game, built into the operating system, or provided as an application. The method may be manually invoked by a user or may be invoked automatically.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), compact disc read/write (CD-R/W) or DVD disc, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (Java and all Java-based trademarks and logos are trademarks or registered trademarks of Oracle and/or its affiliates; other marks may be trademarks or registered trademarks of their respective owners). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present invention.

The invention claimed is:

1. A method, in a data processing system, for diagnosing graphics display problems during running of an application, comprising:
   selecting, by a central processing unit in the data processing system, a frame of the application drawn by a graphics processing unit;
   drawing, by the central processing unit, the frame;
   comparing, by the central processing unit, the graphics processing unit drawn frame and the central processing unit drawn frame to determine if there is a graphics problem.

2. The method as claimed in claim 1, further comprising:
   copying, by the central processing unit, data from a memory of the graphics processing unit used for generation of the selected frame into main memory, wherein the central processing unit uses the copy of the data in main memory to draw the frame.

3. The method as claimed in claim 1, wherein selecting the frame further comprises:
   receiving, by the central processing unit, a user selection of a frame which has not displayed correctly.

4. The method as claimed in claim 1, wherein selecting the frame further comprises:
   automatically selecting, by the central processing unit, a frame according to predefined rules.

5. The method as claimed in claim 1, wherein comparing the graphics processing unit drawn frame and the central processing unit drawn frame further comprises:
   presenting, by the central processing unit, the central processing unit drawn frame to a user; and
   receiving, by the central processing unit, user input regarding whether or not the graphics processing unit drawn frame and the central processing unit drawn frame match.

6. The method as claimed in claim 1, wherein comparing the graphics processing unit drawn frame and the central processing unit drawn frame further comprises:
   automatically comparing, by the central processing unit, the graphics processing unit drawn frame and the central processing unit drawn frame to determine if they match.

7. The method as claimed in claim 1, further comprising:
   responsive to there being a graphics problem, checking, by the central processing unit, a database of stored graphics processing unit drawn frame problems for a similar problem to the graphics processing unit drawn frame.

8. The method as claimed in claim 7, further comprising:
   retrieving, by the central processing unit, a solution for a stored graphics processing unit drawn frame.

9. The method as claimed in claim 1, wherein, if the graphics processing unit drawn frame and the central processing unit drawn frame do not match, it is determined that there is a graphics problem with the application.

10. The method as claimed in claim 1, further comprising:
    notifying, by the central processing unit, a user of at least one of the frame does not have a graphics problem, the frame has a graphics problem and a solution, or the frame has a graphics problem with no solution.

11. The method as claimed in claim 1, further comprising:
    recording, by the central processing unit, a new frame problem with a graphics processing unit drawn frame.

12. The method as claimed in claim 1, including:
    collecting, by the central processing unit, data on common problems with graphics processing unit drawn frames.

13. The method as claimed in claim 1, including;
    collecting, by the central processing unit, data on randomly generated graphics processing unit drawn frames for data mining.

14. A system for diagnosing graphics display problems during running of an application, comprising:
    a central processing unit; and
    a memory coupled to the processor, wherein the memory comprises instructions which, when executed by the central processing unit, cause the central processing unit to:
    select a frame of the application drawn by a graphics processing unit;
    draw the frame; and
    compare the graphics processing unit drawn frame and the central processing unit drawn frame to determine if there is a graphics problem.

15. The system as claimed in claim 14, wherein the instructions further cause the central processing unit to:
    copy data from a memory of the graphics processing unit used for generation of the selected frame into main memory, wherein the central processing unit uses the copy of the data in main memory to draw the frame.

16. The system as claimed in claim 14, wherein the instructions further cause the central processing unit to:
    receive a user selection of a frame which has not displayed correctly.

17. The system as claimed in claim 14, wherein the instructions further cause the central processing unit to:
    automatically select a frame according to predefined rules.

18. The system as claimed in claim 14, wherein the instructions further cause the central processing unit to:
    present the central processing unit drawn frame to the user; and
    receive user input regarding whether or not the frames match.

19. The system as claimed in claim 14, wherein the instructions further cause the central processing unit to:
    an automatic matching component for automatically comparing the graphics processing unit drawn frame and the central processing unit drawn frame to determine if they match.

20. A computer program product for diagnosing graphics display problems during running of an application, the computer program product comprising a non-transitory computer readable storage medium having a computer readable program stored therein, wherein the computer readable program, when executed on a computing device, causes the computing device to:
    select a frame of the application drawn by a graphics processing unit;
    draw the frame; and
    compare the graphics processing unit drawn frame and the central processing unit drawn frame to determine if there is a graphics problem.

* * * * *